United States Patent [19]

Hermes

[11] Patent Number: 5,136,005
[45] Date of Patent: Aug. 4, 1992

[54] COMPOSITION AND METHOD OF PREPARATION OF SOLID STATE DYE LASER RODS

[75] Inventor: Robert E. Hermes, Los Alamos, N. Mex.

[73] Assignee: The United States of America as represented by the United States Department of Energy, Washington, D.C.

[21] Appl. No.: 421,043

[22] Filed: Oct. 13, 1989

[51] Int. Cl.$^5$ ............................................. C08F 18/12
[52] U.S. Cl. .............................. 526/292.3; 526/328.5; 8/648
[58] Field of Search .................. 526/328.5, 268, 292.3; 8/648

[56] References Cited

U.S. PATENT DOCUMENTS 4,016,133  4/1977  Hyosu et al. ...................... 524/718

*Primary Examiner*—Paul R. Michl
*Assistant Examiner*—Yong S. Lee
*Attorney, Agent, or Firm*—Samuel M. Freund; Paul D. Gaetjens; William R. Moser

[57] ABSTRACT

The present invention includes solid polymeric-host laser rods prepared using bulk polymerization of acrylic acid ester comonomers which, when admixed with dye(s) capable of supporting laser oscillation and polymerized with a free radical initiator under mild thermal conditions, produce a solid product having the preferred properties for efficient lasing. Unsaturated polymerizable laser dyes can also be employed as one of the comonomers. Additionally, a method is disclosed which alleviates induced optical stress without having to anneal the polymers at elevated temperatures (>85° C.).

18 Claims, No Drawings

COMPOSITION AND METHOD OF PREPARATION OF SOLID STATE DYE LASER RODS

The United States Government has rights in this invention pursuant to Contract No. W-7405-ENG-36 between the U.S. Department of Energy and the regents of the University of California.

BACKGROUND OF THE INVENTION

The present invention is related in general to the development of polymeric solid hosts for use in laser-pumped, flashlamp-pumped and explosive shock-compressed argon/xenon plasma-pumped lasers which use fluorescent dyes as the gain medium, and more particularly to a formulation and preparative procedure for producing polymeric laser rods having a high enough concentration of fluorescent dye and sufficient optical quality to provide a gain medium for efficient laser oscillation.

The use of polymers as a host matrix for laser-pumped dye lasers (see, e.g., B. H. Soffer et al., "Continuously Tunable, Narrow-Band Organic Dye Lasers," Appl. Phys. Lett. 10(10), 266 (1967)) and flashlamp-pumped dye lasers (see, e.g., O. G. Peterson et al., "Stimulated Emission from Flashlamp-Excited Organic Dyes in Poly(methylmethacrylate)," Appl. Phys. Lett. 12(7), 238 (1968)) has been frequently investigated on an international level since those early reports (see, e.g., R. M. O'Connell et al., "Plastics for High-Power Laser Applications: A Review," Opt. Eng. 22(4), 393 (1983)). The majority of the literature and patents pertaining to this subject have been concerned with polymer hosts composed of poly(styrene) or modified poly(methyl methacrylate).

Modifications include the addition of solvents, comonomers, and low molecular weight plasticizers to impart both solubility of the dye and optical quality to the resulting matrix. There are numerous reports of polymer elements which are composed of poly(methyl methacrylate) incorporating copolymer additives such as methacrylic acid and hydroxyethyl methacrylate, or plasticizers such as ethanol, propanol, and dibutyl phthalate.

Specifically, for rhodamine-6G impregnated poly(methyl methacrylate) elements which were pumped with a doubled Nd:YAG (532 nm), conversion efficiency of up to 47% was reported for laser light at 562 nm (see, e.g., H. H. L. Wang et al., "A Simple, Efficient Plastic Dye Laser," Optics Comm. 18(4), 444 (1976)). In another report describing pumping with a doubled Nd:glass laser (530 nm), conversion efficiency of up to 46% was achieved using a formulation with 10% ethanol/methyl methacrylate polymer (see, e.g., D. A. Gromov et al., "Efficient Plastic-Host Dye Lasers," J. Opt. Soc. Am.:B 2(7), 1028 (1985)).

Furthermore, coaxial flashlamp-pumped lasing of $1.1 \times 10^{-4}$ molar rhodamine-6G incorporated into a poly(hydroxyethyl methacrylate-co-methyl methacrylate) rod (0.95 cm D ×18 cm L) was reported to have an output energy of 50 mJ with an electrical input to the lamp of 60 J. The single point efficiency was then 0.083% with a calculated energy/rod length of 2.8 mJ/cm. A 42 cm rod with $1.4 \times 10^{-4}$ molar coumarin-540 in poly(methyl methacrylate) also had an output energy of 50 mJ with an input of 360 J to the lamp. The efficiency was 0.014% (1.25 mJ/cm) (see, e.g., D. P. Pacheco et al., "A Solid State Flashlamp-Pumped Dye Laser Employing Polymer Hosts," *Proceedings of the International Conference on Lasers '87*, F. J. Duarte, Ed. (STS Press, McLean Virginia (1988))). The rods were prepared in bulk and had relatively poor optical quality, as the researchers had to use a refractive index matching fluid and lenses within the oscillator cavity to obtain lasing. In Y. Hyosu et al., "Fluorescent Colored Resin Particles and Process for Preparation Thereof," U.S. Pat. No. 4,016,133, issued Apr. 5, 1977, a method is described for the preparation of fluorescent, colored resin (polymer) particles with excellent fluorescence, homogenous incorporation of the dye(s), and good lightfastness. A preferred formulation and aqueous emulsion polymerization process was used to make a fluorescent paint which could be applied to clothing. The preferred monomers and weight % composition were:

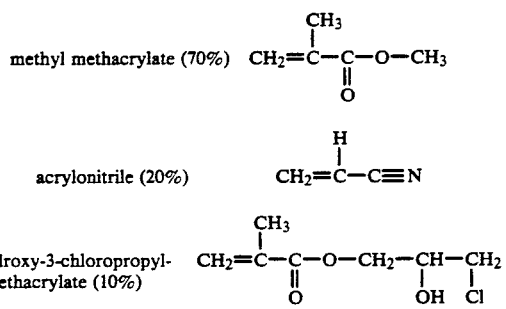

Examples of water-soluble fluorescent dyes included a few which are known laser dyes. This description was included to show a formulation which is similar to that of the present invention but would have to be further processed to make optical polymers suitable for lasing. Processing at elevated temperatures (>100° C.) would thermally destroy the heat sensitive dyes used for laser applications. Therefore, this would not be a useful method.

In S. J. Sheldrake et al., "Dye Impregnated Plastics for Laser Applications," U.S. Pat. No. 4,139,342, issued Feb. 13, 1979, a process for making dye-impregnated plastics for laser applications was described. A solvent-assisted process for nonuniform incorporation of laser dyes into poly(methyl methacrylate) over a period of 2-3 weeks with temperatures up to 95° C. was employed. Using a doubled Nd:YAG laser, a conversion efficiency of 47% was achieved with a ⅛ in. sheet of active element containing nonuniformly mixed rhodamine-6G at a concentration of $1.0 \times 10^{-4}$ molar. A disadvantage of the method disclosed by Sheldrake et al. is the lack of uniformity of the dyed plastic.

Accordingly, it is an object of the present invention to provide a copolymer composition which will permit homogeneous distribution of a laser dye (for a comprehensive listing, see, e.g., *Laser Dye Catalog*, Exciton Chemical Company, Inc., Dayton, Ohio (1989)) into a solid polymeric matrix at sufficient concentrations for significant output of lasing energy, using laser-pumped, flashlamp-pumped, and explosive shock-compressed argon/xenon excitation systems (see, e.g., *Dye Lasers*, F. P. Schafer, Ed., 2nd edition, Springer-Verlag, N.Y., pp. 83-84 (1977)).

Another object of the invention is to provide a process for the mass production of high optical quality plastics in the shape of disks or rods, suitable for use as gain media.

Yet another object of the invention is to provide a solid-state gain medium capable of lasing in the visible region of the electromagnetic spectrum (400-750 nm) using suitable fluorescent dyes and laser, flashlamp, or argon/xenon "bomb" pump energy.

Still another object of the invention is to provide a polymerizable laser dye which is incorporated into the polymeric chain at the molecular level and as a result is nonleachable.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, solid polymeric-host laser rods are prepared using bulk polymerization of acrylic acid ester comonomers which are represented by the following general formula:

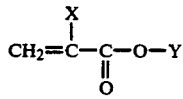

where the major fraction (68-95%) of the copolymer is composed of methyl methacrylate (X=Y=methyl group). The remainder (5-32%) of the copolymer is composed of a monomer having a hydroxyl functional group to enhance the solubility of polar laser dye(s) in both the liquid and solid state. The preferred monomers can be either hydroxypropyl acrylate (X=hydrogen atom, Y=propyl alcohol group), or methyl 2-(hydroxymethyl) acrylate (X=methyl alcohol group, Y=-methyl group), or a combination of both.

In a further aspect of the present invention, in accordance with its objects and purposes, an unsaturated polymerizable dye can be used as a comonomer having the structure:

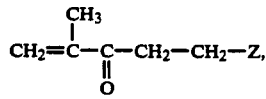

where Z=rhodamine-B dye (i.e., the hydroxyethyl methacrylate ester of rhodamine-B).

In yet a further aspect of this invention, a process is described where polymerizations producing solid state laser rods may be accomplished within 10 days.

Benefits and advantages of the present invention include stress-free (nonbirefringent) laser rods which are characterized by high optical quality, excellent fluorescence, dimensional stability (shelf life), and usefulness for laser-pumped, flashlamp-pumped, or explosive shock-compressed argon/xenon plasma-pumped dye laser applications. Single shot and multiple shot applications in spectroscopy, medical (surgical), and military uses are appropriate for the polymeric-host dye laser rods of my invention.

DETAILED DESCRIPTION OF THE INVENTION

The present invention includes a formulation of acrylic acid ester derivatives and laser dye(s) which when polymerized with a free radical initiator under mild thermal conditions, will produce a solid product having the preferred properties for efficient lasing.

Acrylic acid derivatives used in the preferred embodiment of this invention include those having the following general formula:

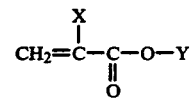

where the major fraction (68-95%) of the copolymer is composed of methyl methacrylate (X=Y=methyl group). The remainder (5-32%) of the copolymer is composed of a monomer having a hydroxyl functional group to enhance the solubility of the polar laser dye(s) in both the liquid and solid state. The preferred monomers can be either hydroxypropyl acrylate (X=hydrogen atom, Y=propyl alcohol group), or methyl 2-(hydroxymethyl) acrylate (X=methyl alcohol group, Y=-methyl group), or a combination of both. These hydroxyl functionalized monomers were chosen to increase the solubility of the laser dyes (prevent aggregation on a molecular scale) in the resultant solid polymer. They are known to exhibit near ideal copolymerization parameters (reactivity ratios) with methyl methacrylate. This is an advantage over hydroxyethyl methacrylate and methacrylic acid which have reactivity ratios with methyl methacrylate such that nonhomogenous polymers are produced in bulk polymerizations.

Since polymerization in bulk results in the production of excess heat and a reduction in volume of 15-20%, a method is disclosed to alleviate induced optical stress without post annealing at elevated temperatures (>85° C.).

Reference will now be made in detail to the present preferred embodiment of the invention.

The polymerizable dye monomer (a new compound) was prepared by the esterification of the carboxylic acid group of rhodamine-B (N-[9-(2-carboxyphenyl)-6-(diethyl-amino)-3H-xanthen-3-ylidene]-N-ethylethanaminium chloride) with 2-hydroxyethyl methacrylate using a general esterification procedure (see, e.g., F. E. Ziegler et al., Synthesis Comm. 9(6), 539 (1979)). A 125 mL erlenmeyer flask equipped with a magnetic stirbar was charged with rhodamine-B (1.14 g, 2.4 mmole), 100 mL dichloromethane, 4-pyrrolidino pyridine (0.036 g, 0.2 mmole), 1,3-dicyclohexylcarbodiimide (0.45 g, 2.2 mmole), and 2-hydroxyethyl methacrylate (0.31 g, 2.2 mmole). The mixture was stirred for 3 days at room temperature, and followed by thin layer chromatography (TLC) using 20% methanol/chloroform as elution solvent. A 2 mL aliquot of the reaction mixture was passed through a preparative scale silica gel column using 20% methanol/chloroform to elute the components. Five fractions were collected and analyzed by TLC. The second fraction was found to be pure product, and was used after the excess elution solvent was removed under reduced pressure.

The comonomer methyl 2-(hydroxymethyl) acrylate, a known compound, was synthesized according to an established procedure (see, e.g., H. M. R. Hoffman et al., Angew. Chem. Int. Ed. Engl. 22, 795 (1983)). The compound was fractionally distilled under vacuum to better than 95% purity, as determined by gas chromatography/mass spectrometry.

The inhibitor in monomer-grade methyl methacrylate was removed by either rotary evaporation under reduced pressur, or by passing it through a column of solid-phase extractant (Dehibit-100 TM, Polysciences, Inc., Warrington, Pa.). Monomer grade hydroxypropyl acrylate was obtained as a mixture of the two isomers: 2-hydroxy-1-propyl acrylate (75%) and 1-hydroxy-2-propyl acrylate (25%), and was used after the inhibitor was removed by solid phase extraction (Polysciences, Inc.).

A chosen quantity of dye was added to a volumetric flask with sufficient volume to prepare from $5 \times 10^{-5}$ to $1 \times 10^{-3}$ molar solution. To this was added a chosen quantity of the hydroxyl functional monomer (5-32% by volume), and the resulting mixture was placed in a water-filled sonicator bath for up to 15 minutes to effect complete dissolution of the dye. Methyl methacrylate was then added until approximately 90% of the volume of the flask was filled with the mixture. The flask containing said mixture was again sonicated for up to 15 minutes. A chosen quantity of bis-azo or peroxide-type free radical initiator (1.0–10.5 mmolar concentration) was added and allowed to dissolve. A final volume of methyl methacrylate was added to the fiducial mark of the flask, and again sonicated for up to 15 minutes. The resulting dye/monomer/initiator mixture was filtered into an appropriate sized test tube (typically 16 mm OD×250 mm L) using a polypropylene syringe equipped with a 1.0 micron filter, followed by a 0.45 micron filter (ACRODISC TM-CR disposable filter assembly, Gelman Sciences, Ann Arbor, Mich.).

The copolymer compositions described above will adhere to an untreated glass surface during the polymerization process. The interiors of the test tubes used in the present invention were chemically treated with a substituted silane in order to make them hydrophobic. This allows the polymer formed during the polymerization process to separate from the wall of the test tube without adverse stress-induced birefringence. Deactivating the glass surface in the following manner results in a molecular-scale mold release. Each test tube was treated with a 5% v/v solution of dimethyldichlorosilane or n-decyl-methyldichlorosilane (Petrarch Systems, Bristol, Pa.) in toluene for a minimum of 30 seconds at room temperature. This allows the silane to react with the hydroxy-silica groups at the glass surface. The reagent mixture was decanted and methanol (HPLC grade, 0.45 micron filtered) was used as a rinse (2×) and also reacted with residual chlorine atoms to produce a methoxy group. The test tube was then oven dried at 100° C. after decanting the last methanol rinse.

The filled test tubes were capped with silicone septa and rapidly purged with argon or nitrogen using a long needle. Oxygen displacement (an effective inhibitor of polymerization) was considered to be complete within 6–10 minutes. The tube/septum was pressurized up to 40 psig with the inert gas before placing said tube into a recirculating water bath held at constant temperature (40°–45° C.). Polymerization occurred over a period of three days, at which time the bath temperature was raised to 60° C. and held for 1 day. The temperature was then raised to 80° C. for the following day. The temperature was then reduced in 10° C. increments over a period of 6 hours, reaching a final temperature of 50° C. The tubes were then placed in a Dewar containing stirred water at 50° C. Thermal losses of the Dewar allowed cooling of the rods down to room temperature within 2 days. This process was necessary in order to reduce stress buildup from thermal shock of the formed polymer matrix.

The laser-rod blank was removed from the test tube, placed into a lathe equipped with a collet and live center, and machined to the chosen size under constant aqueous coolant (to reduce machining stresses to a minimum). The rod was prepared for diamond optical machining by inserting it into a Teflon TM collet, inserting the colleted rod into a doube-sided fixture, and placing another collet around the other end of the rod. The fixture was capable of holding 16 rods at a time. The fixture was placed onto a high-precision diamond turning lathe (Moore Special Tool Co., Inc., Bridgeport, Conn.) with temperature control provided by flowing light mineral oil held at 20.0° C.

The fixture was designed such that after the first end was single-point diamond faced, the fixture was simply inverted to provide access to the second end. This ensured parallelism of the ends, a necessary requirement for laser rod quality. After the second end was faced in a like manner, the fixture was removed and the rods were removed from the fixture. The rods were washed in soapy water using optical-grade lens tissue (to remove the mineral oil and to prevent scratching of the optically flat ends), rinsed with clean water, and dried using optical lens tissue. The peak-to-valley surface figure of the ends was tested using a ZYGO TM interferometer at the He-Ne laser wavelength (632.8 nm). The average peak-to-valley surface figure was lambda/9 with an average RMS (smoothness) value of lambda/37. These values were better than conventional optical polishing by a factor of 2. There was also a factor of 5 savings in the time required (comparing the polishing of 16 rods, both ends (25 hours) with the single-point diamond optical turning of 16 rods, both ends (5 hours)). Using the double-sided fixture, parallelism of the rod ends was found to be better than 15 arcseconds.

Having generally described the present invention, the following specific examples are given as a further illustration thereof.

EXAMPLE 1

Using the procedures set forth hereinabove, a $0.9 \times 10^{-4}$ molar solution of rhodamine-B monomer, hydroxypropyl acrylate (15% by volume), and methyl methacrylate (85% by volume) was prepared with a 1.4 mmolar amount of the initiator 2,2'-azobis(isobutyronitrile). The rod was machined to size and then polished using a conventional optical polishing technique (0.95 cm D×6.5 cm L). Using a commercial triaxial flashlamp-dye laser (SLL-500, Candela Laser Corporation, Wayland, Mass.) equipped with a 52.1% reflectance (52.1% R) output coupler and a 99.9% R total reflector in a flat/flat oscillator cavity, the rod was pumped with an input of 91.5 J, and lased with a measured output of 1 mJ (0.15 mJ/cm). This result provided proof that the polymerized dye molecule is capable of lasing when incorporated as a side group in the polymer structure, although the efficiency was quite low.

EXAMPLE 2

Using the procedures set forth hereinabove, a $1.0 \times 10^{-4}$ molar solution of rhodamine-6G.chloride, hydroxypropyl acrylate (15% by volume), and methyl methacrylate (85% by volume) was prepared with a 2.0 mmolar amount of the initiator 2,2'-azobis(isobutyronitrile). The rod was machined to size and then polished using a conventional optical polishing technique (0.95 cm D×6.5 cm L). Using a commercial triaxial flashlamp-dye laser (SLL-500, Candela Laser Corporation, Wayland, Mass.) equipped with a 55.6% reflectance (55.6% R) output coupler and a 99.9% R total reflector in a flat/flat oscillator cavity, the rod was pumped with an input of 91.5 J, and lased with a measured output of 50 mJ (7.7 mJ/cm) at a wavelength of 602.0 nm (3.3 nm FWHM). The flashlamp had a pulsewidth of 1062 nsec FWHM, and the laser pulsewidth was 438 nsec FWHM.

EXAMPLE 3

Using the procedures set forth hereinabove, a $1.0 \times 10^{-3}$ molar solution of sulforhodamine-B laser dye, methyl 2-(hydroxymethyl) acrylate (5% by volume) and methyl methacrylate (95% by volume) was prepared with a 4.0 mmolar amount of the initiator dodecanoyl peroxide. The rod was machined to size and then polished using a conventional optical polishing technique (0.635 cm D×7.95 cm L). Using a commercial triaxial flashlamp-dye laser (SLL-500, Candela Laser Corporation, Wayland, Mass.) equipped with a 71.5% R output coupler and a 99.9% R total reflector in a flat/flat oscillator cavity, the rod was pumped with various input energies to obtain a slope efficiency of 0.021% and an input energy threshhold for lasing of 19.8 J. At the maximum input of 131.0 J, the rod lased with a measured output of 24 mJ (3.0 mJ/cm) at a wavelength of 624.1 nm (4.4 nm FWHM).

EXAMPLE 4

Using the procedures set forth hereinabove, a $1.0 \times 10^{-4}$ molar solution of rhodamine-6G.chloride laser dye, hydroxypropyl acrylate (15% by volume), and methyl methacrylate (85% by volume) was prepared with a 10.5 mmolar amount of the initiator dodecanoyl peroxide. The rod was machined to size and then diamond faced using the procedure described above (0.953 cm D×10.0 cm L). Using a commercial triaxial flashlamp-dye laser (SLL-250, Candela Laser Corporation, Wayland, Mass.) equipped with a 40.0% R output coupler and a 99.9% R total reflector in a flat/flat oscillator cavity, the rod was pumped with various input energies to obtain a slope efficiency of 0.124% and an input energy threshhold for lasing of 38.2 J. At the maximum input of 164.8 J, the rod lased with a measured output of 140 mJ (14.0 mJ/cm) at a wavelength of 602.2 nm (3.4 nm FWHM).

EXAMPLE 5

Using the procedures set forth hereinabove, a $6.0 \times 10^{-5}$ molar solution of coumarin-540 laser dye, hydroxypropyl acrylate (10% by volume), and methyl methacrylate (90% by volume) was prepared with a 1.0 mmolar amount of the initiator 2,2'-azobis(methyl isobutyrate). The rod was machined to size and then diamond faced using the procedure described above (0.953 cm D×10.0 cm L). Using a commercial triaxial flashlamp-dye laser (SLL-250, Candela Laser Corporation, Wayland, Mass.) equipped with a 49.0% R output coupler and a 99.9% R, 1 meter radius of concave curvature total reflector in a flat/curved oscillator cavity, the rod was pumped with various input energies to obtain a slope efficiency of 0.015% and an input energy threshhold for lasing of 71.8 J. At the maximum input of 164.8 J, the rod lased with a measured output of 13.2 mJ (1.3 mJ/cm) at a wavelength of 535.9 nm (6.2 nm FWHM). With a flashlamp pulsewidth of 760 nsec, lasing occurred with a pulsewidth of 220 nsec (FWHM).

EXAMPLE 6

Using the procedures set forth hereinabove, a $1.0 \times 10^{-4}$ molar solution of sulforhodamine-101 inner salt laser dye and hydroxypropyl acrylate (10% by volume), and methyl methacrylate (90% by volume) was prepared with a 1.50 mmolar amount of the initiator 2,2'-azobis(methyl isobutyrate). The rod was machined to size and then diamond faced using the procedure described above (0.953 cm D×10.0 cm L). Using a commercial triaxial flashlamp-dye laser (SLL-250, Candela Laser Corporation, Wayland, Mass.) equipped with a 33.0% R output coupler and a 99.9% R total reflector in a flat/flat oscillator cavity, the rod was pumped with various input energies to obtain a slope efficiency of 0.020% and an input energy threshhold for lasing of 113.0 J. At the maximum input of 164.8 J, the rod lased with a measured output of 12.0 mJ (1.2 mJ/cm) at a wavelength of 653.8 nm (3.0 nm FWHM). With a flashlamp pulsewidth of 760 nsec, lasing occurred with a pulsewidth of 350 nsec (FWHM).

EXAMPLE 7

Using the procedures set forth hereinabove, a $1.6 \times 10^{-4}$ molar solution of sulforhodamine-B laser dye, hydroxypropyl acrylate (16% by volume), and methyl methacrylate (84% by volume) was prepared with a 2.0 mmolar amount of the initiator 2,2'-azobis(methyl isobutyrate). The rod was machined to size and then diamond faced using the procedure described above (0.953 cm D×10.0 cm L). Using a commercial triaxial flashlamp-dye laser (SLL-250, Candela Laser Corporation, Wayland, Mass.) equipped with a 32.0% R output coupler and a 99.9% R total reflector in a flat/flat oscillator cavity, the rod was pumped with various input energies to obtain a slope efficiency of 0.427% and an input energy threshhold for lasing of 45.0 J. At the maximum input of 164.8 J, the rod lased with a measured output of 520.0 mJ (52.0 mJ/cm) at a wavelength of 626.2 nm (4.0 nm FWHM). With a flashlamp pulsewidth of 760 nsec, lasing occurred with a pulsewidth of 600 nsec (FWHM).

EXAMPLE 8

Using the procedures set forth hereinabove, a $1.6 \times 10^{-4}$ molar solution of sulforhodamine-B laser dye, hydroxypropyl acrylate (16% by volume), and methyl methacrylate (84% by volume) was prepared with a 2.0 mmolar amount of the initiator 2,2'-azobis(methyl isobutyrate). A small vial was used for the polymerization, and the resulting polymeric sample was polished using conventional optical polishing (1.0 cm D×1.4 cm L). A Q-switched, Nd:YAG laser which was externally frequency doubled (532 nm) with a KDP crystal was used for colinear pumping of the short rod. A 30% R output coupler and an appropriate total reflector (passing 532 nm, but having a high reflectance of 610 nm) were used in a flat/flat oscillator cavity. At a measured pump intensity of 22 megawatts/cm$^2$, a 52.5% conversion efficiency was measured with the small rod placed inside the oscillator cavity.

EXAMPLE 9

Using the procedures set forth hereinabove, a $1.5 \times 10^{-4}$ molar solution of sulforhodamine-B laser dye, hydroxypropyl acrylate (16% by volume), and methyl methacrylate (84% by volume) was prepared with a 1.5 mmolar amount of the initiator 2,2'-azobis(-methyl isobutyrate). A specially modified spectrometer cuvette (a short length of tubing was attached to the top) was used for the polymerization process. This resulted in a cuvette-shaped sample which needed no further polishing for effective testing. A standard solution of $1.5 \times 10^{-4}$ molar sulforhodamine-B in methyl alcohol was also used for comparative studies using the doubled Nd:YAG experimental setup described in Example 8, except a 54% R output coupler was used. With a pump beam intensity of 18-28 megawatts/cm$^2$, the methanolic solution contained in a 10 mm pathlength cuvette had an average conversion efficiency of 47.8%±1.2%. The polymeric sample (10 mm thick) had a conversion efficiency of 46.6%±1.1%. This clearly demonstrates that within experimental error, the polymeric-host sample was as efficient at lasing as was the standard liquid sample.

EXAMPLE 10

Using the procedures set forth hereinabove, a $3.2 \times 10^{-4}$ molar solution of sulforhodamine-B laser dye, hydroxypropyl acrylate (32% by volume), and methyl methacrylate (68% by volume) was prepared with a 10.0 mmolar amount of the initiator dodecanoyl peroxide. The resulting rod blanks have not yet been machined, but demonstrate optical clearity and a homogenous distribution of laser dye into the polymeric matrix.

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, it would be apparent to an individual having ordinary skill in the art after reviewing the present disclosure that other laser dyes which span the visible spectrum could be readily incorporated into a solid host using the preferred embodiments of the invention. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A solid state dye laser rod consisting essentially of copolymerized methyl methacrylate and a single monomeric species having the general form BCH$_2$—CH-C=O(OY), where Y is an organic moiety which includes an alcohol group, and a fluorescent organic dye capable of supporting laser action.

2. The solid state dye laser rod described in claim 1, wherein said alcohol group is the propyl alcohol group.

3. The solid state dye laser rod described in claim 1, wherein said methyl methacrylate includes between 68 and 95% of said copolymer.

4. The solid state dye laser rod described in claim 1, wherein the fluorescent organic dye is selected from the group consisting of rhodamine and coumarin dyes.

5. The solid state dye laser rod described in claim 4, wherein the rhodamine dyes include sulforhodamine-B and rhodamine-6G and wherein the coumarin dyes include coumarin-540.

6. A solid state dye laser rod comprising copolymerized methyl methacrylate and CH$_2$=C(X)C=O(OCH$_3$), where X is an organic moiety which includes an alcohol group, and a fluorescent organic dye capable of supporting laser action.

7. The solid state dye laser rod described in claim 6, wherein said alcohol group is the methyl alcohol group.

8. The solid state dye laser rod described in claim 6, wherein said methyl methacrylaee includes between 68 and 95% of said copolymer.

9. The solid state dye laser rod described in claim 6, wherein the fluorescent organic dye is selected from the group consisting of rhodamine and coumarin dyes.

10. The solid state dye laser rod described in claim 9, wherein the rhodamine dyes include sulforhodamine-B and rhodamine-6G and wherein the coumarin dyes include coumarin-540.

11. A solid state dye laser rod comprising copolymerized methyl methacrylate and a mixture of hydroxypropyl acrylate and 2-hydroxymethylacrylate, and a fluorescent organic dye capable of supporting laser action.

12. The solid state dye laser rod described in claim 11, wherein said methyl methacrylate includes between 68 and 95% of said copolymer.

13. The solid state dye laser rod described in claim 11, wherein the fluorescent organic dye is selected from the group consisting of rhodamine and coumarin dyes.

14. The solid state dye laser rod described in claim 13, wherein the rhodamine dyes include sulforhodamine-B and rhodamine-6G and wherein the coumarin dyes include coumarin-540.

15. A solid state dye laser rod which comprises copolymerized methyl methacrylate and an unsaturated polymerizable fluorescent dye capable of supporting laser action.

16. The solid state dye laser rod described in claim 15, wherein said methyl methacrylate includes between 68 and 95% of said copolymer.

17. The solid state dye laser rod described in claim 15, wherein said unsaturated polymerizable fluorescent dye includes CH$_2$=C(CH$_3$)C=O(OCH$_2$CH$_2$Z), where Z is a fluorescent organic dye.

18. The solid state dye laser rod described in claim 15, wherein said unsaturated polymerizable fluorescent dye includes the hydroxyethyl methacrylate ester of sulforhodamine-B.

* * * * *